United States Patent [19]

Padden

[11] 4,067,383

[45] Jan. 10, 1978

[54] HEATING AND COOLING SYSTEM FOR A MULTIPLE COIL INSTALLATION

[76] Inventor: William R. Padden, 13823 Heritage Drive, Riverview, Mich. 48192

[21] Appl. No.: 711,752

[22] Filed: Aug. 4, 1976

[51] Int. Cl.² .................. G05D 23/00; F28F 27/02
[52] U.S. Cl. ............................ 165/35; 165/101; 165/103; 236/1 C
[58] Field of Search .............. 165/34, 36, 103, 101, 165/35; 236/1 C; 417/410

[56] References Cited

U.S. PATENT DOCUMENTS

| | | | |
|---|---|---|---|
| 2,915,298 | 12/1959 | Hamlin et al. | 165/36 |
| 3,170,508 | 2/1965 | Avery | 236/1 C |
| 3,434,282 | 3/1969 | Shelhart | 417/410 |
| 3,995,443 | 12/1976 | Iversen | 165/34 |

FOREIGN PATENT DOCUMENTS

| | | | |
|---|---|---|---|
| 2,402,347 | 7/1975 | Germany | 165/101 |
| 2,331,455 | 1/1975 | Germany | 165/103 |

Primary Examiner—Charles J. Myhre
Assistant Examiner—Parshobam S. Lall
Attorney, Agent, or Firm—Cullen, Settle, Sloman & Cantor

[57] ABSTRACT

The heating and cooling system for a multiple coil installation includes a bypass passage or conduit provided with a check valve which is closed when the pump of either the heating circuit or the cooling circuit is energized and which is opened when the pumps of the heating circuit and the cooling circuit are not energized whereby a third pump which operates continuously, is effective when the check valve is open to continuously circulate the water in a closed path through the bypass circuit which is interconnected to the inlet and outlet sides of the multiple coil installation, thus bypassing the heating and cooling circuits.

7 Claims, 4 Drawing Figures

FIG. 1

HEATING AND COOLING SYSTEM FOR A MULTIPLE COIL INSTALLATION

BACKGROUND OF THE INVENTION

1. Field of the Invention

The heating and cooling system is a hydronic unit, air cooled, gas fired, or electric compression, supplying either chilled water or hot water on demand for a variety of residential or commercial applications. The user changes functions by simply changing the settings of a selector switch.

2. Description of the Prior Art

Arkla Industries, Inc. of Little Rock, Ark. manufactures and sells a chiller-heater unit, AY series sold under the Trademark's "ALL-YEAR" and "SERVEL". Such chiller-heater units are also referred to as SERVEL AY Models and are disclosed and described in a four page brochure of Arkla Industries, Inc., Form No. AC 33T-IR-3, dated April 1975. Such a unit which will be specifically described in the application requires that each coil unit of a multiple coil installation be wired to a control center that would be connected electrically to each one of the multiple coils so that should any one coil require heating or cooling it would have the ability to turn on the unit regardless of the demands of the other multiple coils. Thus, the prior art device requires that each one of the multiple coils be wired thermostatically into a central control panel of the chiller-heater unit.

When one of the multiple coil units would be turned on for a cooling mode, the chiller-heater unit would have to be switched into a cooling mode electrically and then would be cycled on the demand of that particular unit. This would allow each and every thermostat in each and every fan and coil unit to control the chiller-heater unit. This, of course, would make a demand on the unit to run on the cooling mode and cycle frequently which would make it very inefficient in operation because of the short cycling; would use considerable energy; and would result in a very costly installation because of the extra control wiring required for wiring the multiple coil units back to the control center. With the AY or chiller-heater unit in a heating mode, the problems are exactly the same. The multiple coil units would be required to snap on and the AY unit would come on through the control center again and cycle on the demand of any one of the multiple coil units.

SUMMARY OF THE INVENTION

The present invention overcomes the problems of the art by incorporating a bypass passage or conduit in connection with the AY chiller-heater unit, with such bypass conduit being provided with a check valve which is closed when the pump of either the heating circuit or the cooling circuit is energized and which is opened when the pumps of the heating circuit and the cooling circuit are not energized. A third pump is operated continuously during the heating and/or cooling mode and is effective when the check valve of the bypass conduit is open to continuously circulate the water in a closed path through the bypass circuit which is interconnected to the inlet and outlet sides of the multiple coil installation thus bypassing the heating and cooling circuits. The check valve permits the third pump to circulate the water through the bypass circuit and cycle the AY unit as required to control the water temperature. Such a construction reduces the amount of wiring down to a minimum.

DESCRIPTION OF A PREFERRED EMBODIMENT

Figure 1:
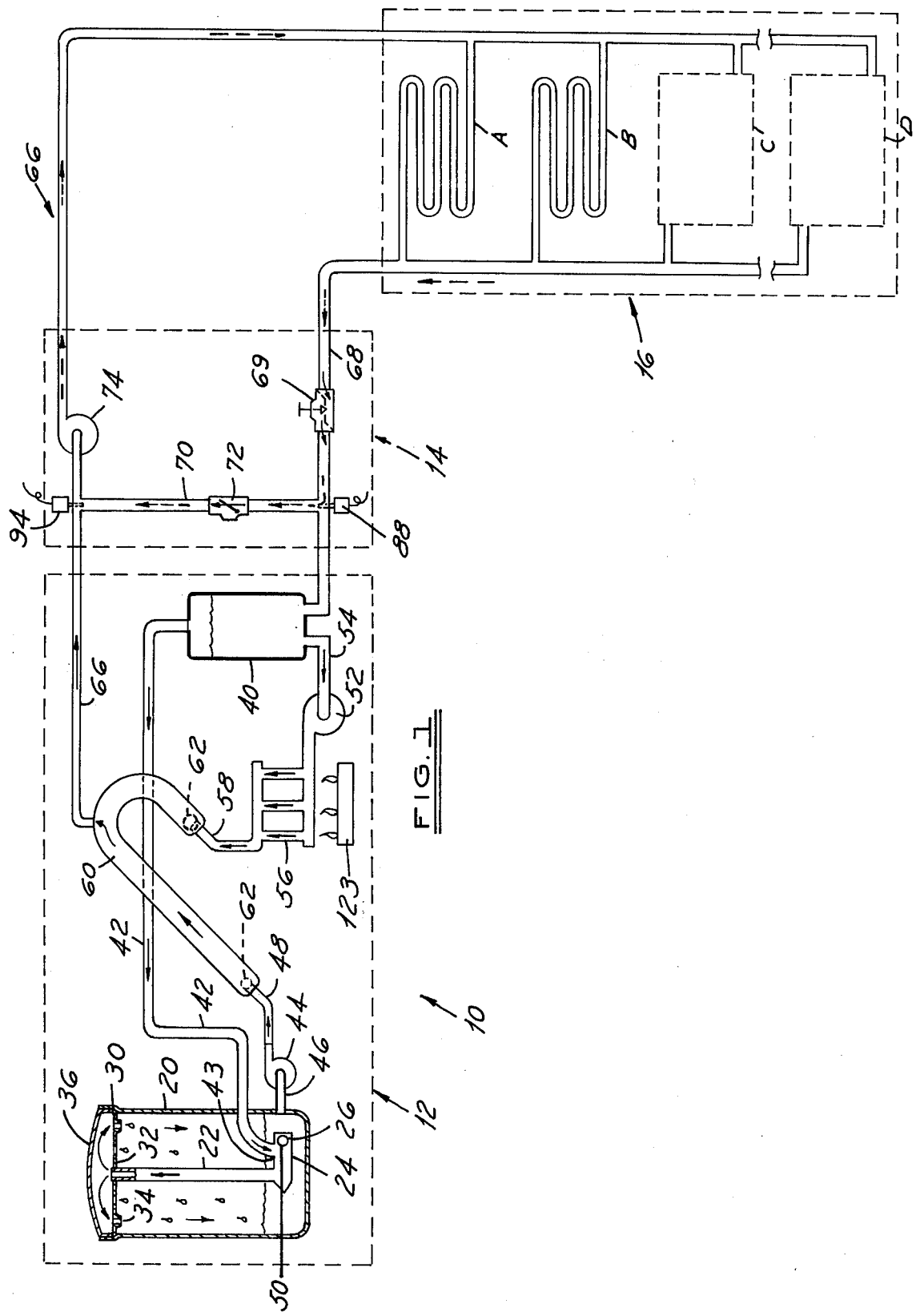
FIG. 1 is a diagrammatic view of the heating and cooling system for a multiple coil installation for a residence or commercial applications.

The heating and cooling system of the present invention is designated in FIG. 1 by the numeral 10 and includes the standard chiller-heater unit 12 manufactured by Arkla Industries, Inc. of Little Rock, Arkansas and sold under the Trademarks "ALL-YEAR" and "SERVEL". The system 10 also includes the bypass circuit 14 which is interposed between the standard chiller-heater unit 12 and multiple coil installation 16 containing coils A, B, C, D, etc., one coil for an individual area of a commercial application or residence.

Figure 3:
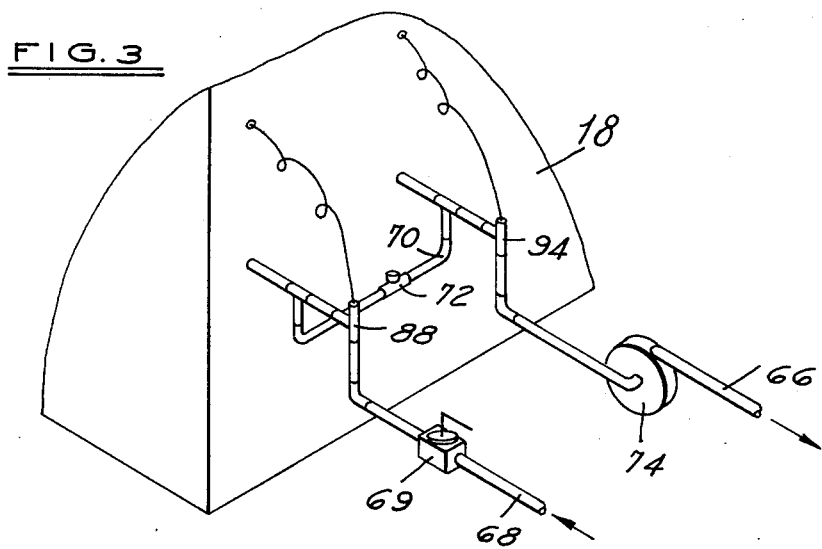
FIG. 3 is a fragmentary pictorial view illustrating the connection of the bypass circuit and third pump to a standard AY chiller-heater unit.

The chiller-heater unit 12 is located in a housing 18 (FIG. 3) which is usually located outside of the building. Such chiller-heater unit 12 is designed for outside installation and thus does not require valuable indoor space; and operates on either natural or propane gas. The bypass circuit 14 may be located inside or outside of the building and is usually located in close proximity to the housing 18 as shown in FIG. 3.

The chiller-heater unit 12 consists of a chiller tank 20 which includes a centrally located upstanding pipe 22 which is provided at the lower end thereof with a generally horizontal tubular extension 24 terminating in an end wall 26 having an orifice or opening 28 provided therein. The chiller tank 20 is provided with a rim 30 in the upper portion thereof. A plate or distribution pan 32 having a plurality of perforations 34 spans the top of the tank 20 and abuts the rim 30. The tube 22 extends upwardly through an opening provided in the plate 32. A cover 36 closes the top of the tank 20 as shown in FIG. 1.

A conduit 42 is connected on one end to a reservoir 40 containing water. The other end of the conduit 42 extends through the side wall of the chiller tank 20 and intersects the horizontal extension 24 of the pipe 22 at an area designated 43. A cold water in-unit pump 44 has the inlet side thereof connected by a conduit 46 to the bottom of the tank 20. The discharge or outlet side of the cold water pump 44 is provided with a conduit 48. A ball check valve 50 is provided in the horizontal extension 24 and controls flow across the orifice 28 as will subsequently appear.

A hot water in-pump 52 has the inlet side thereof connected by a conduit 54 to the reservoir 40. The discharge or outlet side of the pump 52 is connected to a hot water generator 56 provided with a tubular extension or conduit 58. A "candy cane" shaped loop 60 connects the extensions 48 and 58 as shown in FIG. 1. A ball check valve 62 is adapted to seal against the bottom of the "candy cane" shaped loop 60 to close conduit 48 as shown in FIG. 1 or move to the other end of loop 60 to seal against the tubular element 58 as shown by the dotted lines in FIG. 1 depending upon whether the system is in a heating or cooling mode as will subsequently be explained. A conduit 66 extends form the loop 60 towards the inlet side of the multiple coil installation 16. A conduit 68 extends from the outlet side of the multiple coil installation 16 to the water reservoir 40 and has interposed therein a conventional balancing valve or a flow regulating valve 69.

A bypass passage or conduit 70 is interposed between the inlet conduit 66 and the outlet conduit 68. A normally closed check valve 72 is interposed in conduit 70. A continuously operating booster pump 74 is provided in the conduit 66 for circulating the water continuously.

When the thermostat not shown, located in the area to be air conditioned, calls for cooling, the hot water pump 52 is off. The chilled water pump 44 circulates water from the chiller tank 20 and pumps it up the 20 "candy cane" shaped loop 60 and out to the conduit 66 where the chilled water is picked up by the booster pump 74 and circulated through the multi-coil installation 16. The water emerges from the multiple coil installation 16 via the outlet conduit 68 where it returns to the reservoir 40 and from there via conduit 42 to the chiller tank 20 where the water is again cooled. The water does not flow through the tubes of the hot water generator 56 as it returns to the chiller tank 20. The water in the generator 56 is dormant because it is plugged off by the ball check 58 which is held in place against conduit 58 by the pressure from the discharge side of the chilled water pump 44.

When the thermostat is set for heating, the cold water pump 44 is off. The pressure from the hot water pump 52 moves the check ball 62 to seal off the water in the chiller tank. Now the water in the chiller system is dormant. The hot water pump 52 circulates the water from the hot water generator 56 through conduit 66 to the multiple coil installation 16 and back to the generator 56 via conduit 68 to the water reservoir 40. During the heating cycle the reservoir 40 also serves as a place to relieve air, and make up water for the system. The tube 42 from the top of the reservoir 40 passes through the chiller tank 20 and terminates at the extension 24.

The chiller-heater unit 12 just described has a self-leveling feature. Should the water level in the reservoir 40 drop below normal, a vacuum is created at the top of the reservoir 40. The vacuum causes a negative pressure which acts as a suction to draw water up the air release tube or conduit 42. As the water level in the distribution tube falls below the water level in the chiller tank 20, the check ball 50 is forced away from the seat in order to allow the water level to return to normal.

The chiller heater unit 12 requires that anti-freeze and de-foaming agents be utilized in the water system. Anti-freeze must be added to the circulating water system in an amount sufficient to protect the system down to the lowest expected ambient temperature. A minimum of 10 percent anti-freeze by volume should be utilized in the system at all times. It is recommended that a reliable brand of inhibited permanent type anti-freeze without a leak sealant be used with a defoaming agent added thereto.

Figure 2:
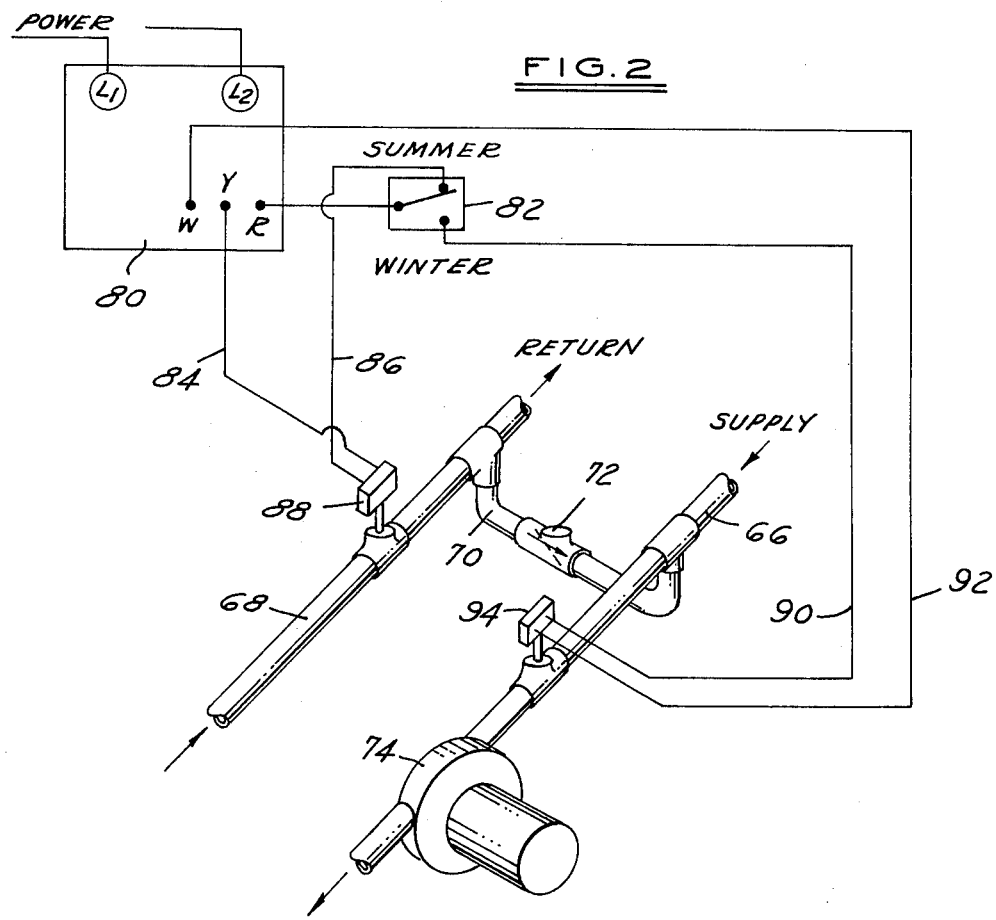
FIG. 2 is a diagrammatic view showing the relationship between the third pump, a check valve incorporated in the bypass conduit and the control panel which is part of the unit electrically connected to the heating and cooling aquastats.

The heating and cooling system 10 includes a control panel 80 as shown in FIG. 2. The chiller-heater unit 12 may operate only in the heating mode or cooling mode but never both modes at the same time. The mode is determined by the position of the switch 82 which may be set for summar or winter use. The switch 82 may be any commercial single pole, double throw switch and is located in a position to be operated only by a person in charge. The switch 82 and the control panel 80 are connected by electrical wires 84 and 86 to the cooling aquastat 88. The panel 80 and switch 82 for winter operation are connected by electrical wires 90 and 92 to the hot water or heating aquastat 94 as shown in FIG. 2. An aquastat is a temperature sensitive control responsive to hydronic temperature change. Such aquastats are standard and are manufactured by Honeywell Corporation and others.

Figure 4:
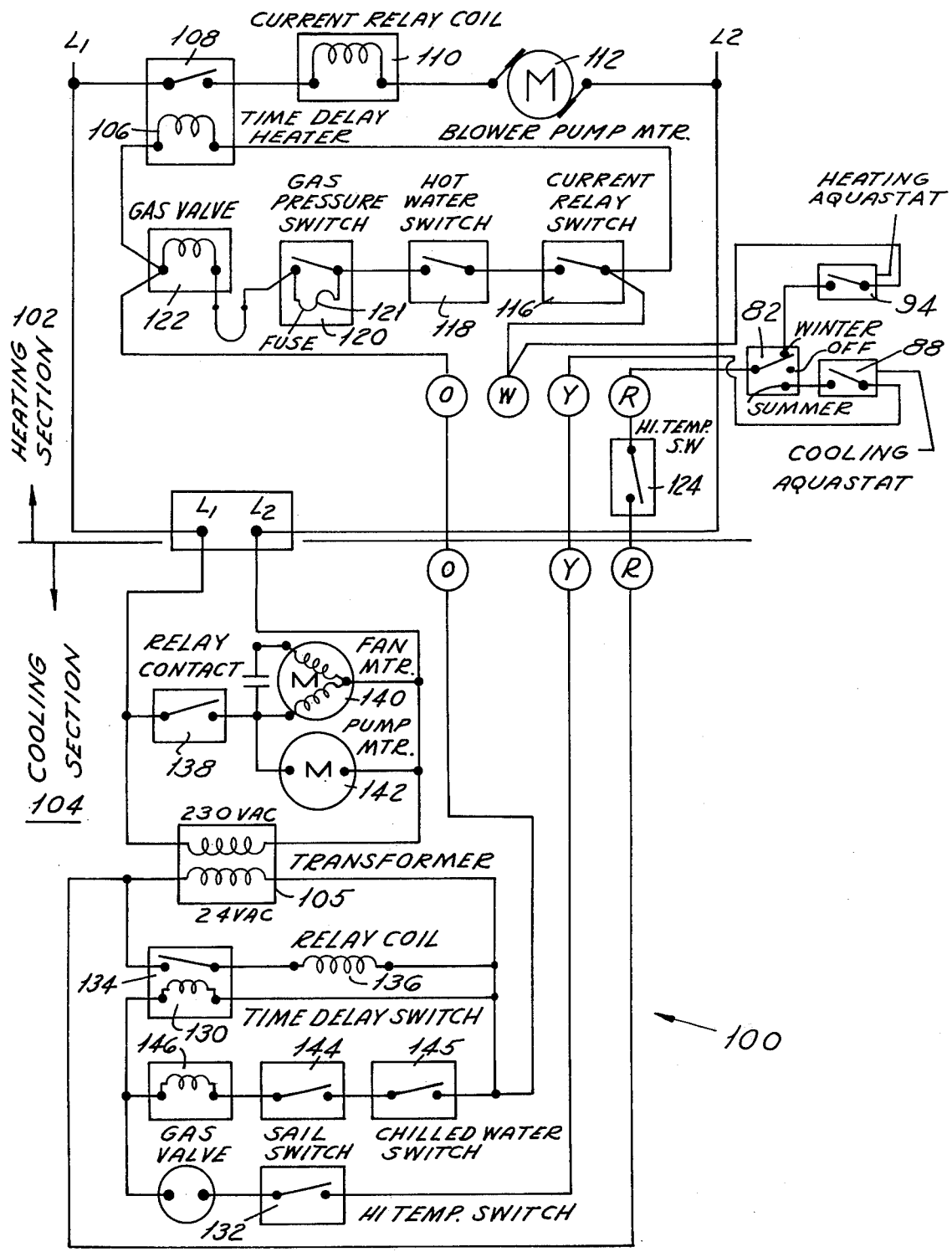
FIG. 4 is an electrical diagram of the chiller-heater unit.

The electrical diagram for the chiller-heater unit 12 is designated by the numeral 100 in FIG. 4 and includes a heating section 102 and a cooling section 104. The chiller-heater unit 12 is wired for 2 wire line voltage 60 cycle single phase current. The control box in the cooling section 104 contains a transformer 105 to supply 24 volts for the low voltage control system of the unit 12. When the switch is in the winter position, the time delay heater 106 is energized. After approximately ninety seconds, the time delay switch 108 closes and the current relay coil 110 is energized which is effective to turn on and energize the blower/pump motor 112 and initiate current flowing through the current relay switch 114, the hot water switch 116, the gas pressure switch 120, and the gas valve 122. This results in the turning of the burner 123 for the hot water generator 56 and the starting of the heating process. The high temperature switch 124 is designed to turn the unit 12 off if too high a temperature is sensed at the hot water generator 56.

When the switch 82 is set for summer or the cooling mode, current flows to the time delay heater 130 provided the high temperature switch 132 is closed. When the time delay switch 134 closes, the relay coil 136 closes the relay contacts 138 and starts the fan motor 140 and the pump motor 142. When the fan is up to speed the sail switch 144 and chilled water switch 145 close and the gas valve 146 opens and starts the cooling process.

The purpose of the hot water generator high temperature switch 124 is to interrupt operation if the temperature of the generator 56 rises too high due to loss of water circulation in the system and is designed to open at 190° F. The switch 124 is a manual reset and must be cool before it can be reset.

The purpose of the hot water switch 118 is to interrupt the burner operation if the hot water temperature rises above 170° F. while the unit 12 is operating on the heating cycle. This is an automatic reset switch.

The purpose of the hot water pressure relief valve is to relieve pressure of the hot water circuit should the pressure reach 45 psig. It will automatically reset after excessive pressure is relieved.

The purpose of the current relay 110 is to hold the main gas valve off until combustion blower operation is proven and to shut the main gas off when the combustion blower motor 112 stops.

The purpose of the gas pressure switch 120 is to interrupt burner operation if the manifold gas pressure is lower than 1.5 inches W.G. for natural gas fired units or 7 inches W.G. for propane gas fired units. The switch 120 is provided with a ⅛ AMP type MDL glass fuse 121.

The purpose of the sail switch 144 is to hold the main gas valve off until the condenser fan operation is proven, and to shut off the main gas valve 146 should the condenser fan stop or an insufficient amount of air is passing through the coils.

The pump drive motor 142 operates the hydraulic pump and the chilled water pump 44. The chilled water switch 145 is set to de-energize the gas valve at 42° F. and automatically resets on temperature rise at approximately 55° F.

The high temperature switch 132 is to protect the generator 56 from overheating. The switch 132 directly interrupts the unit operation and is manually reset.

The cooling or summer aquastat 88 is installed in the return line or conduit 68 to control the burner operation of the chiller side of the unit 12. The aquastat 88 may be set at 55° F. on and at 45° F. off.

The hot water or winter aquastat 94 is installed in the conduit 66 to control the burner operation of the "heater" side. A setting of 155° F. on and 165° F. off is recommended.

The third pump 74 is a constant circulation pump and has the same flow rate (gpm) as the "in-unit" first and second pumps 44 and 52. The third pump 74 is wired to be energized upon energization of either pump 44 or 52 and to remain energized when the pumps 44 or 52 are not energized. As noted previously the third pump 74 serves as a booster pump to overcome the resistance of the chilled-hot water piping system and to circulate water through the bypass circuit 70 when the pumps 44 and 52 are not energized.

In operation, when the switch 82 is set for the summer or cooling mode, the chiller or second pump 44 is energized as is the third pump 74. At such time the pump 52 is not energized. Water from reservoir 40 is withdrawn therefrom via the conduit 42 as shown by the solid line arrows in FIG. 1 and enters the chiller tank 20 where it rises in the tube 22; is cooled by an evaporator coil, not shown, in the tank 20; and is thereafter gravity fed to the bottom of the tank 20 via the perforated distribution pan 32. The check valves 28 and 62 are held against the orifice 26 and conduit 58 respectively by the back pressure of the pump 44 and the chilled water from tank 20 is withdrawn therefrom and circulated by pump 44 through the loop 60 into the conduit 66 where the fluid head is increased by the booster pump 74 which circulates the chilled water through the multiple coil installation 16 upon demand. The water thereafter enters the return conduit 68 and returns to reservoir 40 where the cycle is repeated. Once the temperature of the water in the system reaches, as an example, 45° F., the temperature sensing control or cooling aquastat 88 which is set at 45° F., responds and turns off the chilled water pump 44.

At such time the check valve 72 opens since there is no back pressure from the pump 44 to keep it closed and the chilled water is circulated by the pump 74 in a closed path from conduit 68 across the bypass passage 70 and valve 72; conduit 66 and the multiple coil installation 16. The pump 74 circulates the water in the aforementioned closed path as shown by the dotted arrows in FIG. 1 so long as the water remains in the temperature range of 45° F. to 55° F. When the temperature of the water reaches 55° F., the aquastat 88 responds and turns on the chilled water pump 44 and the check valve 72 closes. The cooling system operates as previously described and the pump 44 remains energized until the water temperature returns to 45° F. at which time aquastat 88 shuts off pump 44 and the chilled water is circulated in the bypass circuit by the pump 74.

When the switch 82 is set for the winter or heating mode, the first or hot water pump 52 is energized as is the booster pump 74. Water from reservoir 40 is circulated by pump 52 through the generator 56 where the water is heated. The check valve 62 is forced to the lower end of the loop 60 and is held against conduit 48 by the back pressure of pump 52. The hot water is then circulated through the system via loop 60, conduit 66, multiple coil installation 16, return conduit 68 and reservoir 40. The cycle is repeated until the temperature reaches the limit of the setting of aquastat 94 at a temperature of 165° F. Thereafter the aquastat 94 is effective to turn off pump 52 and the check valve 72 opens. Thereafter the hot water is circulated in a closed path by pump 74 through bypass conduit 70 and valve 72 as described previously. Once the temperature is reduced to 155° F., the aquastat 88 responds and reenergizes pump 52 thereby closing check valve 72 and the bypass conduit. The heating system operates as previously described and the pump 52 remains energized until the water reaches a temperature of 165° F. at which time aquastat 94 shuts off pump 52 and the hot water is circulated in the bypass circuit by the pump 74.

In conclusion, the chiller-heater unit 12 is an outdoor heating and cooling unit consisting of two sections namely an open type hydronic chiller or cooling section and a water tube heat exchanger or heating section.

The evaporator coil in the chiller tank 20 is gas fired, and the heat exchanger 56 is also gas fired. This is a dual unit to heat or cool water and can only operate as a chiller or as a heater, but never both at the same time. Each section has a hydronic circulating pump. The cooling system has a drive motor 142 which drives the hydronic chiller pump 44, and also drives the solution pump, not shown. The refrigerant solution pump, not shown, and the hydronic chiller pump 44 must operate together to result in any cooling effect. If for some reason the refrigerant solution pump should operate without the hydronic chiller pump 44, the refrigerant cycle would be forced into an unbalanced condition and would be shut down by the safety controls, not shown.

The hydronic heating pump 52 is direct driven from the two ended drive motor 112 with a venter blower, not shown, on the opposite end. When the gas burner 123 comes on, simultaneously the drive motor 112 is started causing the pump 52 and blower to run. The water is circulated through the heat exchanger 56 and is heated by the hot gases of combustion being drawn over the heat exchanger 56 by the venter blower, not shown. If the burner 123 is shut off and the drive motor 112 is left on, obviously the water flowing through the heat exchanger 56 will be cooled very rapidly by the outside air being drawn over the heat exchanger by the venter blower, not shown, that is connected to the opposite end of the drive motor 112. This will cause a heat loss almost equal to the heating input and results in a waste of energy.

The chiller-heater unit 12 is designed to operate as a hydronic heating and cooling system with one blower assembly including coil, drainpan, filter, etc. and room thermostat to cycle the unit 12 located somewhere outside to satisfy the demand from the occupied space.

The present invention answers the question of how the chiller-heater unit 12 can be used economically on one or more blower coil units A, B, C, D, etc. and satisfy the demands in the occupied spaces.

As explained previously, the hydronic chiller pump 44 or the hydronic heating pump 52 cannot run continuously. One solution to the problem would be to interlock electrically all blower coil units to the chiller-heater unit 12. This is too costly of an installation, and would result in wasted energy.

Another solution would be to provide various exterior piping arrangements for constant circulation of water through the unit 12. This would be very difficult if not impossible to balance the established flow rates.

The present invention has solved this problem very economically with the use of the check valve 72 and the exterior mounted pump 74 to provide a constant flow of water through the exterior system, with the chiller-heater unit 12 cycling on and off as required by an aquastat 88, 94 located in the path of the constant circulating water.

I claim:

1. A heating and cooling system for supplying hot or cold water to a multiple coil installation comprising a heating circuit, a cooling circuit and a bypass circuit, said heating circuit including, a water reservoir, a temperature sensing control and a first pump, said cooling circuit including said water reservoir, a temperature sensing control and a second pump, a first conduit intersecting said heating and cooling circuits and extending to the inlet side of the multiple coil installation, a second conduit connecting the outlet side of the multiple coil unit with said reservoir, said bypass circuit including a third conduit connecting said first and second conduits, a check valve in said third circuit, and a third pump in said first conduit downstream of the intersection of said first and third conduits, said third pump being continuously energized when the system is in a heating or cooling mode, and control means for energizing said first pump or said second pump to circulate hot or cold water through said heating or cooling circuit respectively, one of said first or second pumps being energized and the other one of said first or second pump being energized depending on whether the system is in the heating mode or cooling mode, said check valve being closed in said third conduit while said first pump or said second pump is energized, and remaining closed until the temperature sensing control of the heating or cooling circuit shuts off the corresponding first or second pump after which time said check valve opens, whereby the water from the multiple coil installation is circulated by said third pump in a closed path through said bypass circuit, said conduits and the multiple coil installation, thus bypassing said heating and cooling circuits, said first and second pumps both being deenergized when said bypass circuit is opened.

2. The heating and cooling sytstem defined in claim 1 wherein said check valve is maintained closed as a result of the back pressure of said first or second pump when energized.

3. The heating and cooling system defined in claim 1 wherein each temperature sensing control is in the form of an aquastat.

4. The heating and cooling system defined in claim 1 wherein said heating circuit includes a generator for heating the water and said cooling circuit includes a tank for cooling the water.

5. The heating and cooling system defined in claim 4 wherein said heating circuit includes a loop between the outlet side of the generator and the discharge side of said second pump, with a ball check valve movable in said loop depending on whether the first or second pump is energized to open the discharge side of said second pump and to close the outlet side of said generator during the cooling mode and to close the discharge side of said second pump and to open the outlet side of said generator during the heating mode.

6. The heating and cooling system defined in claim 5 wherein said ball check valve in said loop is maintained closed during the heating mode or cooling mode, as a result of the discharge pressure of said first or second pump when energized acting in said loop against said ball check valve.

7. The heating and cooling system defined in claim 6 wherein each temperature sensing control is in the form of an aquastat.

* * * * *